United States Patent Office 3,516,900
Patented June 23, 1970

3,516,900
GAS ACTIVATED BONDING OF POLYAMIDES
William C. Mallonee, Chapel Hill, N.C., and Henry E. Harris, Savannah, Ga., assignors to Monsanto Company, St. Louis, Mo., a corporation of Delaware
Continuation-in-part of application Ser. No. 528,699, Feb. 16, 1966. This application June 17, 1968, Ser. No. 737,507
Int. Cl. D04h 1/04
U.S. Cl. 161—150    27 Claims

ABSTRACT OF THE DISCLOSURE

Touching polyamide shaped structures, such as filaments, films, small pellets or granules and the like are autogenously bonded together along their contiguous surfaces by the absorption and subsequent desorption of an activating gas such as a hydrogen halide to form products including bonded, nonwoven fabrics, porous pellices and the like.

---

This application is a continuation-in-part of a copending application filed Feb. 16, 1966 and having a Ser. No. of 528,699, now abandoned.

This invention relates to a method of autogenously bonding shaped structures containing polyamides and particularly to the preparation of self-bonded mats of polyamide filaments to produce non-woven fabrics.

Heretofore non-woven structures have been bonded by the use of external binders or by softening the filaments with heat, solvent, or plasticizer and subjecting them to pressure while in the softened state. The external binder may be an adhesive substance which is cured after the application thereof, or it may be rendered adhesive after application by use of heat, solvent or plasticizer. External binders may be applied as powder, solutions, emulsions, or even in the form of fibers; however, these methods suffer from several disadvantages. The use of an outside binder presents problems in uniform application and limits the properties of the entire web to those of the binder. Thus, for example, if a fiber with a relatively low melting point is used as a bonding material, the temperature conditions to which the web or resulting fabric may be subjected are limited by the melting point of the binder fibers.

Autogenous bonding by the previous methods is not easily controlled and frequently tends to alter the aesthetic properties of the web. For example, in solvent bonding, achieving adequate adhesiveness in the filaments without dissolving the entire web or at least impairing the physical properties thereof is difficult. Furthermore, the intersections at which the filaments are bonded frequently have a swollen appearance or other evidence of solution and redeposition of polymer which is generally referred to as polymer migration. In most instances, these swollen areas around the bonds do not possess the same dye acceptance level because of changes in the crystalline structure which is localized at the bond site thereby causing non-uniform dyeing. With the foregoing problems in mind, it is a primary object of the present invention to provide bonded polyamide structures and blends thereof which are free from external bonding agents and visible polymer migration at the bond points.

Another object of this invention is to bond shaped polyamide structures being free of external bonding agents in the final product, without altering the geometry of the structures and without visibly building up an excess of the polymer at the bend points.

A further object is to prepare drapable self-bonded, non-woven fabric structures suitable for use in clothing applications.

A further object is to provide an improved process for preparing self-bonded, non-woven polyamide fabrics in which the bonding is activated by a gaseous material which is subsequently completely removed.

A still further object is to use polyamide fibers as binder fibers in blends with other classes of fibers, using the gaseous material to activate the bonding properties of the polyamide.

Yet another object is to bond touching polyamide granules together by means of an activating gas to form a porous board.

Other objects and advantages of the present invention and their means of attainment will be apparent from the following description and accompanying drawing.

In its broadest aspect, the present invention comprehends the bonding of two touching polyamide structures at their contiguous surfaces by exposure to an activator such as a gaseous hydrogen halide or boron trifluoride followed by removal of the activating gas. The activator gas can be removed or desorbed either by washing in a neutral or slightly basic water bath or by heating to temperatures above about 90° C. Hydrogen chloride is the preferred activating gas because of its faster absorption and desorption rate and comparative ease of handling. For brevity and convenience, hydrogen chloride gas will be referred to as the activating gas in describing the invention herein. Preferably, the activating gas should be maintained at about 20 to 25° C. for uniform treating conditions and handling convenience although bonding can be accomplished at substantially higher and lower temperatures. The absorption rate is a function of the temperature with faster absorption occurring at elevated temperatures, that is, temperatures above 0° C. It has been found however, that the amount of activating gas absorbed decreases with a corresponding increase in temperature until no absorption at all takes place when the temperature exceeds approximately 110° C.

While aqueous solutions of hydrogen chloride (hydrochloric acid) are known solvents for many polyamides, substantially unionized pure hydrogen chloride is not a solvent, and the process of this invention may be carried out under totally anhydrous conditions, indicating that the bonding process is not dependent upon solution and reprecipitation of polymer. Further, polymers other than polyamides which are also soluble in hydrochloric acid do not undergo this bonding reaction when subjected to gaseous hydrogen chloride in accordance with the techniques of this invention.

To obtain this bonding reaction, the structures must be touching. In the case of two intersecting filaments, it may be desirous to place the filaments under tension. For example, in a mat of filaments, the tension may be accomplished by shrinking the entangled filaments after the mat has been formed, or by subjecting the mat to pressure. Pressing of the mat can precede or follow exposure to hydrogen chloride. In practice, the "pre-pressing" has an advantage in that the pressing equipment need not be exposed to the activating gas. Post-pressing however, has the advantage of imparting greater strength to the mat because of an increase in pressure imposed on the filament intersections.

The discovery has been made that polymers which can be self-bonded under the influence of hydrogen chloride gas (HCl) have in common in their structure the —NHCO— group. In order to exhibit this bonding property, the polymer needs an adequate concentration of these groups which are accessible and attached to groups which do not alter bascity unfavorably. It has been found that polyamides containing some aromatic groups will undergo this bonding reaction, but certain wholly aromatic polyamides do not undergo the reaction despite concentrations of —NHCO— groups comparable to that in polyhexamethylene adipamide (nylon 66) which bonds very easily. This may result from the rigidity of the structure of from the effect of the aromatic rings on the basicity of the amide group or from a combination of these effects.

While the mechanism of the bonding is not completely understood, it is believed that it is based on disruption of hydrogen bonds between the polymer chains by formation of an HCl complex with the amide group. In the polymer art, it is well known that many of the physical properties of polyamides depend to a great extent on the intermolecular hydrogen bonds between the —CO— and —NH— groups in adjacent polymer chains. The bonds form cross links between the molecular chains, increasing such properties as melting points and tensile strengths. When these bonds are disrupted by the action of the hydrogen chloride, the polymer chains within the structure become more flexible and tend to shift to relieve the stress caused by tension or pressure on the structure. The complex formation is reversible and when the hydrogen chloride is desorbed, the hydrogen bonds reform. In the shifted position of the polymer chains, many of the new bonds are formed between chains in two different structures. Photomicrographs of cross-sections of filaments bonded by this process show a homogeneous structure at the site of the bond with no indication of a boundary between the two filaments. Further support for this theory lies in the fact that self-bonding polymers cannot be bonded to polymers which are not self-bonding under the conditions of this process. However, two different polyamides which are self-bonding can be bonded to one another. Bonding is accomplished with exposure times which may vary from 1 sec. to several minutes, depending on composition and structure of the material to be bonded. Effective bonding has been achieved with concentrations of HCl ranging from 100% to 25% mixtures with air. By regulation of exposure time, depth of penetration of the gas into the individual filaments can easily be controlled and limited to the depth necessary to obtain desired bonding. In practice, good bonding has been achieved with penetrations as low as 5% of the cross-sectional area of the filaments but penetration of between 20 and 50 percent is preferred. Optimum time of exposure varies with the polymer composition, the concentration of the activating gas, the filament diameter, and previous physical treatment of the filaments. In general, fine denier filament, because of greater surface area per unit weight, will require a shorter time of exposure than will heavier denier filaments from the same polymer composition. Also, it has been observed that freshly spun filaments which have not been drawn generally require shorter exposure time than drawn filaments.

Prolonged exposure times tend to lower tensile strength of filaments probably because of a depth of penetration which permits a substantial decrease in orientation.

Desorption of the activating gas may be achieved at room temperature by washing with water or a very dilute aqueous solution of a base, or it may be achieved under completely anhydrous conditions by application of heat. The latter method offers the advantage of simpler recovery of the activating gas. Temperatures necessary for desorption are far below the softening or melting temperatures of the polymers and therefore do not alter the physical properties of the polymeric structures.

For a better understanding of the present invention reference should be made to the accompanying drawing, in which.

Figure 3:
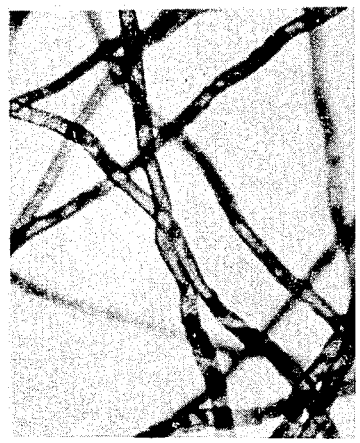
Figure 4:
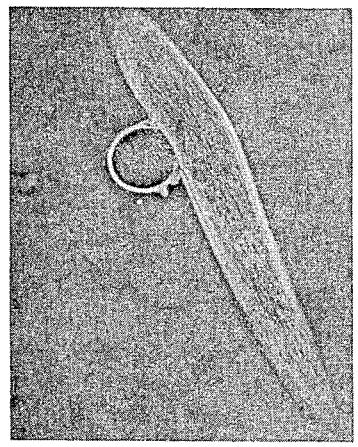

FIG. 3 is a photograph at 280 magnification of a web of randomly arranged 2-denier filaments which have been bonded at less than one-half of the cross-over points to illustrate that the bonded intersections are not visually detectable from those which are not bonded; and FIG. 4 is a photograph at 280 magnification of the cross-section of two nylon filaments bonded together with the absorption and desorption of hydrogen chloride gas in accordance with the process of the present invention. This photomicrograph was obtained using phase contrast microscopy so that small differences in refractive indices could be detected. It will be noticed that the outer areas of the filaments are lighter and thus possess less orientation.

Fibrous webs bonded by this process are characterized by a structure in which bonded intersections are not visibly distinguishable from non-bonded cross-overs of fibers even at magnifications of 280× as illustrated in FIG. 3. There is no visible migration of polymer as in known solvent bonding processes. This noticeable distinction is clearly depicted by FIGS. 1 and 2. Another important characteristic of fibrous webs bonded by the technique of this invention is the fact that a strong and flexible bond can be obtained with less than 1 micron of penetration of the activating gas as shown in FIG. 4 which illustrates the nature of the bond between two nylon filaments and the surface depth penetrated by the gaseous activator.

The bonded mats are further characterized by retention of a high percentage of the flexibility of an unbonded web while having a greatly increased tensile strength. Samples have been prepared in which substantial increases in tensile strength have been accompanied by only slight increases in bending length (inverse measure of drapability). The overall orientation of the filaments in the webs is not significantly altered by the bonding process and dyeability remains uniform throughout the web.

In the preferred embodiment of this invention, bonding of webs is carried out in a continuous process. Freshly spun filaments are attenuated by an air-jet and formed into a random web on a moving foraminous belt. The web is then carried into a chamber through which the activating gas is passed. After exposure to the gas, the web is passed into a second chamber where the activating gas is desorbed either by a neutral bath or heat. If desorption is accomplished by washing, the web is then passed to a drying chamber.

It is not essential that the webs of this invention be composed of polyamide filaments only. Other fibers which are chemically inert to hydrogen chloride gas may be blended with polyamide filaments to provide fabrics having different physical properties. Webs can be prepared from continuous filaments of polyamide and at least one other filament-forming material which is spun simultaneously with the polyamide filaments. These filament-forming materials include synthetics such as the polyester, acrylics, polyolefins and elastomeric filaments such as spandex and artifical filaments such as rayon and acetate. If desired, the webs may be prepared by known methods of blending staple fibers from staple fiber blends which include the above materials and also natural fibers such as cotton and wool. Web formation of staple fibers may be accomplished on the Rando-Webber or conventional carding machines to form single-layered webs or multilayered and cross-layered webs can be formed by known methods. Entanglement of the fibers comprising the web can be achieved by needle punching to cause densification thereof if desired. When these webs which contain a component of polyamide fibers is exposed to the activating gas, the polyamide fibers bond to one another so that the other fibers are held together by physical entrapment. The entrapment however permits limited movement of the unbonded fibers which produces better flexibility. As would be expected, the strength of the bonded webs or fabrics decreases with a decrease in percentage of the polyamide fibers content in the blend.

The following specific examples illustrate bonding filaments of various polyamide compositions and various web structures, but are not intended to limit the scope of this invention.

The term "bonding efficiency" is used to describe the strength of the bonded web in relation to the strength of the fibers from which it is made. It is measured by dividing the breaking strength of a five-inch length of web one inch wide by the breaking strength of a theoretical zero-inch length of web. The latter value is determined by testing the breaking strength with jaws of the tensile tester set zero distance apart ("zero gauge"). In this determination, it is assumed that at a zero span, individual fibers will be gripped by both jaws of the tensile tester, and that the breaking strength will be that of the aggregate of fibers. It is further assumed that at a jaw span of 5 inches, individual fibers will not be caught in both jaws, and the strength of the web will reflect primarily the strength of the bonds. In principle this indication of bonding strength is based on findings of R. I. C. Michie as reported in Textile Research Journal 33, No. 6, 403–411 (June 1963). The zero-span tensile test has been recognized for some time as a means of determining the contribution of the fibers to the strength of a paper web, W. A. Wink and R. H. Van Eperen, TAPPI 45, No. 1, 10–24 (1962).

The term "performance ratio" is used to describe the combined properties of strength and drapability. It is the ratio of the breaking strength in pounds per inch of width of web to its bending length in inches. Bending length is determined according to ASTM Test D 1388–55T. Essentially it is one-half the length of unsupported fabric necessary to bend under its own weight from the horizontal plane to contact a declining angle of 41.5° of slope from the point of departure of contact. Thus, the more drapable the fabric, the shorter the bend length. Since both high strength and drapability contribute to a high value, a high performance ratio is a desirable characteristic in a non-woven fabric.

EXAMPLE I

Figure 1:
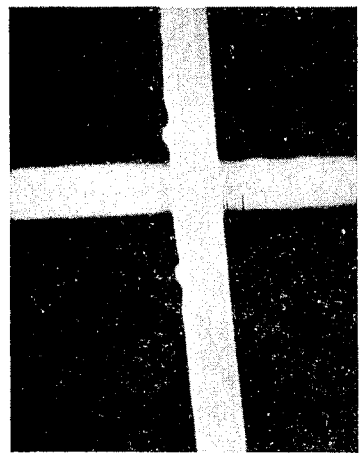
FIG. 1 is a photograph at 200 magnification of two 15-denier filaments bonded together in accordance with the process of this invention to illustrate the uniform appearance of the fibers at their cross-over point.
Figure 2:
FIG. 2 is a photograph at 200 magnification of two 15-denier filaments similar to those of FIG. 1, but which were bonded by a commercial solvent to illustrate the very noticeable globules caused by polymer migration of the cross-over point of the bonded filaments.

Two 15-denier filaments of nylon 66 without finish were crossed under tension so that pressure was developed at the cross-over point. In this state the fibers were exposed to an atmosphere of gaseous hydrogen chloride for 7 seconds at room temperature and subsequently washed in water to remove all traces of the HCl. The filaments were bonded together with a strong bond which did not alter the diameter of the filaments at the bond site. The breaking strength of the bond was found to be 8.3 grams. FIG. 1 shows a cross-section of a bond formed in this way to illustrate the unaltered diameter of the filaments after bonding has occurred. The only difference in the filaments noticed after exposure to the HCl was slight delustering caused during the removal of the HCl.

EXAMPLE II

Two drawn 15-denier filaments of nylon 66 were crossed under tension and exposed for seven seconds to an atmosphere of gaseous hydrogen chloride at room temperature as described in Example I. The filaments were then treated for one minute with a stream of air heated to about 90° C. to desorb the HCl. The filaments were bonded together and retained their original luster and clarity. The breaking strength of the bond was 6.9 grams.

EXAMPLE III

The experiment was carried out as described in Example I except that the filaments were exposed to gaseous boron trifluoride in place of hydrogen chloride. An exposure time of 25 seconds was necessary to obtain a strong bond between the filaments.

EXAMPLES IV–VIII

Several pairs of short pieces of nylon 66 copolymer yarns were crossed under tension, exposed to gaseous hydrogen chloride for 10–20 seconds at room temperature and washed with water to remove the HCl. The yarns were bonded together with a very strong bond. The compositions of the fibers that were used as shown in Table 1 below.

TABLE 1

| Example | Acid component [1] | | Base component [2] | |
|---|---|---|---|---|
| | Mole percent [3] | Material | Mole percent [4] | Material |
| IV | 10 | Terephthalic acid | | |
| | 10 | Isophthalic acid | | |
| V | 10 | 5-t-butylisophthalic acid | | |
| VI | | | 40 | Cis, trans-1,4-cyclohexanebis (methylamine). |
| | | | 40 | m-Xylylenediamine. |
| VII | 30 | Terephthalic acid | | |
| | 10 | 3-p-carboxyphenyl)-1, 1, 3-trimehtyl-5-indancarboxylic acid. | | |
| VIII | 15 | Terephthalic acid | | |
| | 5 | Isophthalic acid | | |

[1] Other than adipic acid.
[2] Other than hexamehtylenediamine.
[3] Of acid components.
[4] Of base components.

EXAMPLE IX

Short pieces of fiber prepared from melt blended nylons were crossed under tension, exposed to gaseous hydrogen chloride for 10 seconds and subsequently washed with water. The fibers were bonded together without an external binder or polymer migration. The blend consisted of 49% of nylon 66 polymer with 51% of a polymer made from hexamethylene diamine, terephthalic acid and isophthalic acid, the acids being in a 40:60 ratio.

EXAMPLE X

In a procedure similar to Example IX, fibers from a blend of 27% nylon 66 polymer and 73% of the terephthalic acid-isophthalic acid-hexamethylene diamine polymer were bonded.

EXAMPLE XI

Short pieces of scoured Japanese silk 13/15 were crossed under tension, exposed to gaseous hydrogen chloride for 10 seconds and subsequently washed with water. A reasonably strong and flexible bond was formed.

EXAMPLE XII

Small strips of nylon 66 film were crossed under tension, exposed to gaseous hydrogen chloride for 10 seconds and subsequently washed with water. The strips were bonded together quite strongly. The films were also made cloudy and opaque by this treatment because the water causes the surface to crystallize in large spherulitic structures that scatter light.

EXAMPLE XIII

Small strips of nylon 66 film were crossed under tension, dried under vacuum, exposed to gaseous hydrogen chloride for 10 seconds and subsequently heated under vacuum with an infra-red light to remove the hydrogen chloride. The strips were bonded together quite strongly and retained their original clarity. The original clarity was maintained because the dry desorption process does not produce large spherulitic structures as caused by desorption of HCl with water.

EXAMPLE XIV

Several 3-denier filaments of nylon 66 were crossed under tension, exposed to gaseous hydrogen bromide for 15 seconds and subsequently washed in water to remove the hydrogen bromide. The bonded filaments were examined for traces of bromide but none was present.

EXAMPLE XV

Webs of continuous filament nylon 66 were made by rapidly attenuating the filaments directly from a melt spinning jet and forming a non-woven layer of continuous filaments on a screen. Small 3 x 3 inch swatches of this web were exposed to 100% HCl gas for short periods to allow absorption of the gas. The HCl was then desorbed by neutral or slightly basic water. The treatment was carried out on unpressed samples as well as on samples which had been embossed with a pattern or flat pressed to make the filaments contiguous.

The pressing was done by placing the swatches between engraved or flat plates and imposing a pressure of 200 p.s.i. at 200° C. for 10 seconds. In Table 2 below the physical properties of the swatches were compared with those of a commercial non-woven fabric prepared from staple fibers and with a spun bonded continuous filament polyester fabric. Properties of the latter were obtained from a report which appeared in Textile Research Journal 35, 322–329 (April 1965).

TABLE 2

|  | Spun-bonded polyester | Plain web HCl bonded (exposed 10 sec.) | Embossed web HCl bonded (exposed 5 sec.) | Flat pressed HCl bonded (exposed 10 sec.) | Commercial non-woven |
|---|---|---|---|---|---|
| Weight, oz./yd.[2] | 3.6 | 4.4 | 3.5 | 4.8 | 3.6 |
| Thickness, mils | 24 | 38 | 22 | 11 | 22 |
| Density, gms./cm.[3] | 0.20 | 0.16 | 0.21 | 0.58 | 0.22 |
| Tensile strength:[1] |  |  |  |  |  |
| Lbs./in | 25.2 | 20.6 | 26.5 | 33.5 | 6.5 |
| Lbs./in./oz./yd.[2] | 7.0 | 4.7 | 7.6 | 7.0 | 1.8 |
| Elongation, percent |  |  |  |  |  |
| Bending length, in.[1] | 2.8 | 2.3 | 2.3 | 2.0 | 1.9 |
| Performance ratio, lbs./in./in | 9.0 | 9.0 | 11.5 | 16.8 | 3.4 |

[1] Machine direction.

EXAMPLE XVI

Webs consisting of direct-spun, self-crimping, continuous filament nylon 66 (6.6 denier per filament with 3.2 grams per denier tenacity and 75 percent elongation to break) were treated for 5 seconds in an atmosphere of 100% HCl. Variations in the procedures produced fabrics having properties as illustrated in Table 3 below.

TABLE 3.—FABRIC PROPERTIES

| Sample No | 1a | 1b | 2a | 2b | 3 | 4 |
|---|---|---|---|---|---|---|
| Weight, oz./yd.[2] | 5.6 | 8.1 | 4.0 | 5.4 | 5.7 | 3.8 |
| Thickness, mils | 46.0 | 49.5 | 36.0 | 35.0 | 29.0 | 54.0 |
| Density, gms./cm.[3] | 0.165 | 0.22 | 0.15 | 0.21 | 0.26 | 0.09 |
| Tenacity, lbs./in./oz./yd.[2] | 7.1 | 4.1 | 11.25 | 3.2 | 10.9 | 1.7 |
| Elongation, percent | 44.3 | 83.8 | 72.4 | 84.8 | 62.4 | 167.1 |
| Bending length, in | 2.2 | 2.1 | 1.4 | 1.1 | 2.3 | 1.1 |
| Performance ratio, lbs./in./in | 18.2 | 15.8 | 32.1 | 15.7 | 27.0 | 6.0 |

1a—Web was pattern embossed with a ribbed and checkered design under 223 p.s.i. pressure at 200° C. for 10 seconds before exposure to HCl. The HCl was desorbed in water, and then the web was steam treated to develop crimp.
1b—Procedure same as 1a except that crimp was developed before exposure to HCl.
2a—Web was flat pressed under 223 p.s.i. pressure at 200° C. for 10 seconds and then treated in the same manner as 1a.
2b—Flat pressed web was treated in the same manner as 1b.
3—Web was flat pressed under 900 p.s.i. pressure at 200° C. for 10 seconds and treated as in 1a.
4—Web was not pressed before exposure to HCl gas and the subsequent treatment described in 1a.

Further evaluation of this bonding principle was accomplished under dynamic experimental conditions where anhydrous HCl was passed through the webs for various lengths of time. Illustrations of this technique are found in Examples XVII, XVIII, and XIX. Gas and air mixtures were passed through the webs under gas delivery pressures ranging from 5 to 10 p.s.i.g. at rates from 10 to 30 grams per minute. The webs weighed between 1.4 oz./yd.[2] and 4.6 oz./yd.[2].

EXAMPLE XVII

A direct-spun web consisting of straight, continuous filament nylon 66 (1.9 denier per filament with 3.8 grams per denier tenacity and 134 percent elongation to break) was flat pressed at 223 p.s.i. at 150° C. for 15 seconds. It was then exposed to a 50% mixture of anhydrous HCl and air for 10 seconds. The HCl and air mixture was passed through the web at a rate of 20 grams per minute.

Test data showed the treated web had a tenacity of 16.1 lb./in./oz./yd.² The "0" gauge tenacity of the web was 16.9 lb./in./oz./yd², indicating a bonding efficiency of 95 percent. The bonding efficiency of the untreated web was only 0.2 percent. The following Table 4 shows how the bonding efficiency of HCl-treated direct-spun nylon webs compares with the bonding efficiency of other webs which were bonded with a second constituent.

TABLE 4

| Bonding | Tenacity (lbs./in./oz./yd.²) | | Bonding efficiency, percent a/b×100 |
|---|---|---|---|
| | (a) Five inch | (b) Zero inch | |
| 50%, HCl/air on 1.5 oz./yd.² web | 16.1 | 16.9 | 95 |
| 100% HCl on 2.6 oz./yd.² web | 11.2 | 12.8 | 88 |
| 50%, HCl /air on 2.8 oz./yd.² web | 10.1 | 14.0 | 72 |
| 50%, HCl/air on 2.4 oz./yd.² web | 14.1 | 14.0 | 101 |
| Acrylate "Rhoplex B-15" on 2.5 oz./yd.² web | 2.4 | 14.4 | 17 |
| Urethane latex on 3.0 oz./yd.² web | 9.3 | 15.0 | 62 |
| "Pellon" commercial 3.6 oz./yd.² web | 1.8 | 6.6 | ¹ 27 |
| | 6.0 | 11.5 | ² 52 |
| | 2.6 | 8.6 | ³ 30 |

¹ Machine.
² Transverse.
³ Bias.

The above data clearly illustrate that the bonding which is faciliated with the employment of hydrogen chloride gas is superior to some well known bonding techniques.

EXAMPLE XVIII

A direct-spun web consisting of straight, continuous filament nylon 66 (3.0 denier per filament with 3.5 gram per denier tenacity and 146 percent elongation to break) was flat pressed at 223 p.s.i. at 200° C. for 10 seconds and then exposed to concentrated HCl gas for 10 seconds. The gas was passed through the web at a rate of 30 grams per minute. Desorption of the HCl was accomplished with water. The web had a tenacity of 8.1 lbs./in./oz./yd². The "0" gauge tenacity of the web was 9.5 lbs./in./oz./yd.², indicating a bonding efficiency of 84%. The untreated web was very weak after pressing at 200° C. and its cohesive strength, in terms of bonding efficiency, was only about 0.2 percent.

EXAMPLE XIX

An indication of the effect produced by the length of exposure time to gaseous HCl is illustrated below in Table 5. The samples were prepared from a web of straight continuous filament 66 nylon. The webs, which had a weight of 1.4 oz./yd.², were exposed to a 50% mixture of HCl and air for the time indicated.

TABLE 5

| | | |
|---|---|---|
| Exposure time (sec.) | 3 | 7 |
| Tenacity (lbs./in.) | 13.0 | 14.7 |
| Bending length (in.) | 1.75 | 0.94 |
| Performance ratio | 17.3 | 15.6 |

It will be noticed that the longer exposure time increased the tenacity of the web, but the increase in bending length increased at a greater proportional rate to lower the performance ratio. Thus, the exposure time will be determined in part by the particular physical properties desired.

EXAMPLE XX

Various webs of 66 nylon which had not been embossed or flat pressed were subjected to treatment in an atmosphere of 100% HCl, followed by desorption of the HCl (with water) to give the following properties:

TABLE 6

| | Straight Filaments | | | | Crimped filaments ¹ |
|---|---|---|---|---|---|
| HCl exposure time, sec. | 5 | 2 | 5 | 7 | 5 |
| Weight, oz./yd.² | 4.4 | 5.3 | 7.1 | 7.1 | 3.8 |
| Thickness, mils | 38 | 68 | 63 | 71 | 54 |
| Density, gm./cm.³ | 0.16 | 0.10 | 0.15 | 0.13 | 0.09 |
| Tenacity strength, lbs./in./oz./yd.² | 4.7 | 8.0 | 5.6 | 6.2 | 1.7 |
| Elongation, percent | 137 | 158 | 105 | 134 | 167 |
| Bending length, in | 2.30 | 2.39 | 2.90 | 2.94 | 1.06 |
| Performance ratio, lbs./in./in | 9.0 | 17.8 | 13.7 | 15.0 | 6.0 |

¹ Filaments developed 16 crimps/inch.

EXAMPLE XXI

Two inch crimped staple nylon 66 and nylon 66 blends with Acrilan were carded into webs on the basis of 25 grams per batt. The staple was one and a half denier. Blends contained 75, 50 and 25 percent nylon 66. The webs were flat pressed or checkered embossed at 900 p.s.i.g. at 200° C. for 10 seconds and exposed to 100 percent anhydrous HCl for 30 seconds. A 75 percent nylon 66 web was flat pressed under the same conditions without exposure to HCl gas to compare physical properties and bonding effectiveness in the treated webs. The following Table 7 summarizes the results.

TABLE 7

| | Unbonded | | | Bonded | | |
|---|---|---|---|---|---|---|
| Composition, percent nylon | 75 | 100 | 75 | 75 | 50 | 25 |
| Pre-embossed | Flat | Flat | Flat | Checkered | Flat | Flat |
| Weight, oz./yd.² | 4.1 | 3.5 | 3.9 | 3.8 | 4.5 | 4.0 |
| Thickness, mils | 43 | 25 | 21 | 45 | 13 | 23 |
| Density, gm./cm.³ | 0.13 | 0.19 | 0.25 | 0.11 | 0.46 | 0.23 |
| Tenacity, lb./in./oz./yd.²: | | | | | | |
| 5 inch gauge | 0.1 | 4.8 | 3.7 | 4.5 | 2.3 | 1.1 |
| 0 inch gauge | 7.1 | 4.5 | 4.1 | | | |
| Elongation, percent | 56 | 22 | 24 | 35 | 15 | 12 |
| Bending length, ins | 1.1 | 2.0 | 1.8 | 1.4 | 1.8 | 1.4 |
| Performance ratio, lbs./in.² | 0.4 | 8.4 | 8.0 | 12.2 | 5.4 | 3.2 |

Tensile strengths indicate a high degree of bonding efficiency. For each 25 percent decrease in nylon concentration there was a corresponding percent decrease in tensile strength. For example, as illustrated above in Table 7, 4.8 lbs./in./oz./yd.² less 25 percent=3.6; 4.8 lbs./in./oz./yd.² less 50 percent=2.4; and 4.8 less 75 percent=1.2. A corresponding decrease in bending length was not as evident, although the bending length was reduced 30 percent when the concentration of nylon was reduced 75 percent.

The checkered embossed pattern on the web comprised of 75 percent nylon fibers produced a highly bonded fabric without increasing the unbounded web density. Its bending length was not substantially greater than the flat pressed, unbonded web.

EXAMPLE XXII

Referring to Example XXI, the staple blend containing 75 percent nylon 66 was flat pressed or checkered embossed after being exposed for 30 seconds to 100 percent HCl gas. The pressure imposed on the gas laden web was 25 to 180 p.s.i.g. for 10 seconds at 150° C.

The heat caused the HCl gas to be desorbed from the nylon, and the fibers were bonded by a mechanism similar to the one when HCl gas was desorbed in water. High pressures, such as those used in the pre-press treatments at elevated temperatures, caused the fibers to deform into a stiff, fibrous film. The non-woven fabric properties produced by this post-pressing, dry desorption process are as follows:

TABLE 8

| Post-embossed | Flat | Flat | Checkered | Checkered |
|---|---|---|---|---|
| Pressure at 150° C., p.s.i.g. | 25 | 80 | 55 | 180 |
| Weight, oz./yd.² | 5.6 | 4.3 | 4.0 | 3.8 |
| Thickness, mils | 24 | 13 | 20 | 15 |
| Density, gm./cm.³ | 0.31 | 0.49 | 0.27 | 0.34 |
| Tenacity, lbs./in./oz./yd.² | 6.0 | 5.5 | 5.3 | 6.1 |
| Elongation, percent | 35 | 29 | 27 | 22 |
| Bending length, ins. | 2.5 | 2.0 | 1.9 | 1.7 |
| Performance ratio, lbs./in.² | 13.2 | 13.2 | 11.2 | 13.6 |

It is significant that the tensile strength of the flat post-embossed samples were nearly twice as great as the tenacity of the flat pre-embossed 75% nylon sample in the previous example. The bending lengths were also increased, but there was an improvement in the performance ratio of tensile strength (lbs./ins.) to bending length (inches). The checkered post-embossed samples were not greatly improved in tensile strength.

EXAMPLE XXIII

A web weighing 25 grams consisting of 50 percent by weight of polyester (Dacron) and 50 percent nylon 66 by weight was prepared on a Shirley Miniature Card machine forming a 10" x 30" web. The nylon and polyester fibers were 3 denier per filament and 1½ inches in length. The web was subjected to one pass through a Hunter Laboratory Punch.

The web was then washed with $CCl_4$ to remove finish, dried and pressed between 11 gauge mesh wire screens for 30 seconds at 390° F. and 20 tons on a 12" x 8" Pasadena Hydraulic Press.

Two 4" x 7" samples were used for testing. One sample was tested without further treatment (non-bonded) and the other was exposed to 100 percent gaseous HCl for 30 seconds and subsequently washed in water. A considerable increase in breaking strength was obtained without increasing the bending length. Results of physical tests were as follows:

TABLE 9

| | Bending length, inches | Breaking strength, lb./in. | |
|---|---|---|---|
| | | 0 inch gauge | 5 inch gauge |
| Non-bonded | 1.0 | 33.3 | 3.0 |
| Bonded | 1.0 | 30.6 | 15.1 |

EXAMPLE XXIV

A direct-spun web consisting of straight continuous filament nylon 66 (1.7 denier per filament with 3.6 grams per denier tenacity and 125 percent elongation to break) was exposed to 50 percent HCl and air mixture for 10 seconds. The mixture was passed through the web at 20 grams per minute under a pressure of 5 p.s.i.g. into a 1.3 inch Hg vacuum. After exposure to the HCl/air mixture, samples were either control pressed employing spacing means to thicknesses of 25 and 15 mils, or flat pressed under 2 p.s.i.g. at room temperature. The post-pressing was followed by desorption in water. The results showed the web's tensile strength increased from 5.0 lbs./in./oz./yd.² to 6.7 as the compression on the gas laden web increased.

The direct-spun web was treated with the 50 percent HCl and air mixture under the same conditions but flat pressed at 150° C. under pressures of 13 and 26 p.s.i.g. for 10 seconds followed by continued heating for 50 seconds to desorb the gases and initiate bonding the fibers. The tensile strengths were 9.4 and 13.3 lbs./in./oz./yd.² respectively with 2.9 inches bending length. Embossed checkered and ribbed patterns embossed under pressures of 50 and 100 p.s.i.g. under the same conditions produced a tensile strength of 7.0 lbs./in./oz./yd.² with 2.3 inches bending length.

The process of the present invention provides a novel and improved method for bonding fibrous webs in a continuous operation to provide economically fabrics having high performance. Fabrics produced in accordance with this invention do not contain an external binder and therefore have the advantage of being constructed from 100 percent fiber content. The fabrics are not limited to special treatments which will not adversely affect the binders used heretofore to bond non-woven structures. Thus, the fabrics of this invention have more of the desirable properties and characteristics of woven fabrics than the conventionally bonded non-wovens.

What is claimed is:

1. An autogenously bonded article comprised of at least two overlapping and contiguous linear polyamide fibers, said fibers including molecules having recurring

linkages capable of entering into the formation of intermolecular hydrogen bonds with

linkages of adjacent molecules, said fibers, being autogenously bonded together along said contiguous surfaces by the formation of intermolecular hydrogen bonds between

linkages of one fiber with

linkages of the overlapping fiber, said intermolecular hydrogen bonds having been formed between fibers without polymer migration.

2. The article of claim 1 wherein said article is comprised of a plurality of polyamide fibers bonded together along their contiguous surfaces which form a non-woven fabric.

3. The article of claim 2 wherein the polyamide fibers comprising said non-woven fabric are continuous.

4. The article of claim 2 wherein said non-woven web including a second group of fibers formed from polymers other than those containing recurring

linkages, said second group of fibers being mechanically locked within said non-woven web by said bonded polyamide fibers.

5. The article of claim 1 wherein the formation of intermolecular hydrogen bonds between fibers is completed by the absorption and subsequent desorption of a chemically activating, non-solvating gas.

6. The article of claim 5 wherein said chemically activating gas is selected from the groups consisting of a hydrogen halide and boron trifluoride.

7. A supple non-woven fabric having strength properties approaching those of woven fabrics and being comprised of at least 10 percent polyamide fibers, said fibers including molecules having recurring

linkage capable of entering into the formation of intermolecular hydrogen bonds with

linkages of adjacent molecules, said polyamide fibers being molecularly bonded to each other throughout the web at a substantial number of touching fiber cross-over points by the formation of intermolecular hydrogen bonds between

linkages of said touching fibers, the molecular orientation of the fibers being substantially unchanged throughout except for the surface layer of said filaments, and the geometrical shape of said filaments being unchanged at the cross-over points where bonding has occurred.

8. The fabric of claim 7 wherein bonding is promoted by a chemically activating gas.

9. The fabric of claim 8 wherein the chemically activating gas is a hydrogen halide.

10. The fabric of claim 8 wherein the chemically activating gas is boron trifluoride.

11. The fabric of claim 8 wherein the chemically activating gas is hydrogen chloride.

12. The fabric of claim 7 wherein said polyamide fibers are continuous in length.

13. The fabric of claim 7 wherein the fibers are a blend of polyamide staple fibers and at least one other synthetic staple fiber.

14. The fabric of claim 13 wherein the blend of staple fibers is comprised of polyamide and natural fibers.

15. The fabric of claim 7 wherein the surface layer of the fibers has a uniform degree of crystallinity whereby uniform dyeability of said fabric is enhanced.

16. A process for producing an autogenously bonded fabric comprising the steps of forming a fibrous mat comprised of at least 10 percent polyamide fibers, said fibers including molecules having recurring

linkages capable of entering into the formation of intermolecular hydrogen bonds with

linkages of adjacent molecules, said polyamide fibers touching each other at a substantial number of cross-over points, exposing said mat to a chemically activating gas being at a temperature less than 100° C. for sufficient time to permit said gas to penetrate the surface layers of said fibers and removing said chemically activating gas from the fibers thereby autogenously bonding said fibers together by the formation of intermolecular hydrogen bonds between

linkages of said touching fibers to produce a bonded textile fabric free of external binder.

17. The process as described in claim 16 wherein the process is continuous.

18. The process of claim 16 wherein a force is imposed on said fibers.

19. The process of claim 16 wherein the gas is boron trifluoride.

20. The process of claim 16 wherein the gas is a hydrogen halide.

21. The process of claim 16 wherein the gas is hydrogen chloride.

22. The process of claim 16 wherein the gas is a mixture of hydrogen chloride and air.

23. The process of claim 16 wherein the fibers are exposed to the gaseous activator from 1 second to 5 minutes.

24. The process of claim 16 wherein the bonding is accomplished under completely anhydrous conditions.

25. The process of claim 16 wherein the gas is removed by washing the fabric in water.

26. The process of claim 16 wherein the gas is removed with heat.

27. The process of claim 16 wherein said force is imposed on the fibers after said fibers have been subjected to the gas.

References Cited
UNITED STATES PATENTS

| | | | |
|---|---|---|---|
| 2,252,999 | 8/1941 | Wallach. | |
| 2,543,101 | 2/1951 | Francis | 161—150 |
| 2,730,478 | 1/1956 | Morgan | 161—150 |
| 2,730,479 | 1/1956 | Gibson | 161—150 |
| 2,774,128 | 12/1956 | Secrist | 28—79 |
| 2,876,524 | 3/1959 | Reyerson et al. | 8—115.5 |
| 3,075,823 | 1/1963 | Reyerson et al. | 117—118 |
| 3,395,060 | 7/1968 | Guldner | 156—209 |

ROBERT F. BURNETT, Primary Examiner

R. L. MAY, Assistant Examiner

U.S. Cl. X.R.

156—306; 264—83